United States Patent
Ramsay

(10) Patent No.: US 9,797,760 B2
(45) Date of Patent: Oct. 24, 2017

(54) QUANTITATIVE ANALYSIS OF FLOW PROFILE CHARACTERISTICS FOR ULTRASONIC METERING SYSTEMS

(71) Applicant: DANIEL MEASUREMENT AND CONTROL, INC., Houston, TX (US)

(72) Inventor: Lawson Hamilton Ramsay, Falkirk (GB)

(73) Assignee: Daniel Measurement and Control, Inc., Houston, TX (US)

( * ) Notice: Subject to any disclaimer, the term of this patent is extended or adjusted under 35 U.S.C. 154(b) by 1155 days.

(21) Appl. No.: 13/928,521

(22) Filed: Jun. 27, 2013

(65) Prior Publication Data
US 2014/0109687 A1    Apr. 24, 2014

Related U.S. Application Data

(60) Provisional application No. 61/716,167, filed on Oct. 19, 2012.

(51) Int. Cl.
G01F 1/66    (2006.01)

(52) U.S. Cl.
CPC .................... *G01F 1/66* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,397,194 A * | 8/1983 | Soltz | ......................... | G01F 1/66 73/227 |
| 2011/0196624 A1* | 8/2011 | Hackett, III | ............ | G01F 1/667 702/45 |
| 2014/0109645 A1* | 4/2014 | Ramsay | .................... | G01F 1/00 73/1.34 |
| 2014/0109686 A1* | 4/2014 | Ramsay | .................... | G01F 1/66 73/861.18 |
| 2014/0109689 A1* | 4/2014 | Ramsay | .................... | G01F 1/66 73/861.28 |
| 2014/0109690 A1* | 4/2014 | Ramsay | .................... | G01F 1/66 73/861.28 |
| 2014/0111342 A1* | 4/2014 | Ramsay | ................. | G01F 1/662 340/606 |
| 2015/0000420 A1* | 1/2015 | Ramsay | ............... | G01K 15/007 73/861.01 |

* cited by examiner

Primary Examiner — Huan Tran
(74) Attorney, Agent, or Firm — Conley Rose, P.C.

(57) ABSTRACT

An ultrasonic flow metering system includes a condition monitor. For each chordal path of a plurality of chordal paths of an ultrasonic flow meter the condition monitor is configured to compute: 1) a reference chordal velocity ratio; 2) a predicted chordal velocity based on the reference chordal velocity ratio for the chordal path and measured flow velocities for all other chordal paths of the plurality of chordal paths; 3) a first estimated mean flow velocity for the ultrasonic meter, the first estimated mean flow velocity based on the predicted chordal velocity for the chordal path and the measured flow velocities for all other chordal paths of the plurality of chordal paths; and 4) for each other chordal path of the plurality of chordal paths, a predicted chordal velocity ratio based on the measured flow velocity for the other chordal path and the first estimated mean flow velocity.

28 Claims, 12 Drawing Sheets

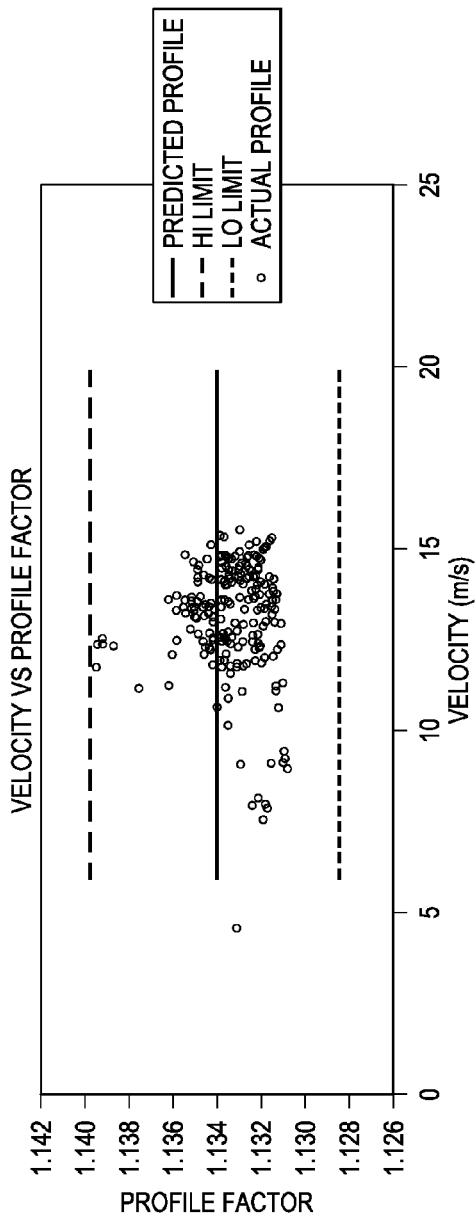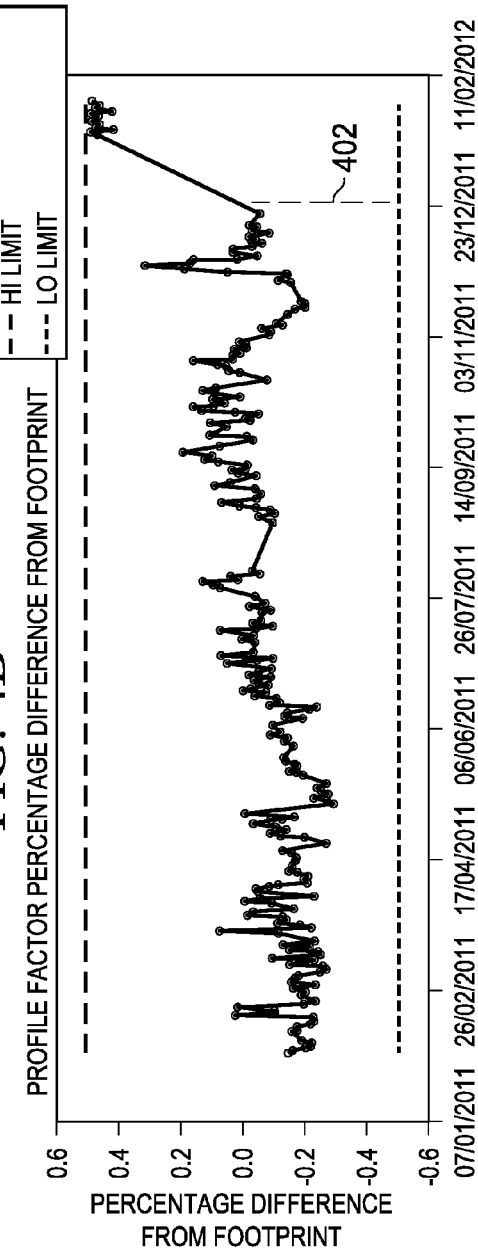

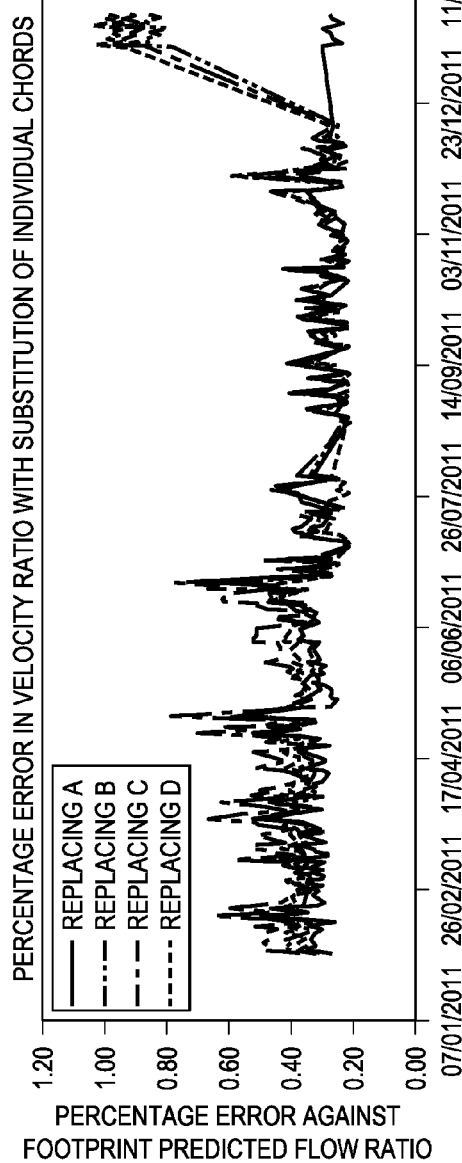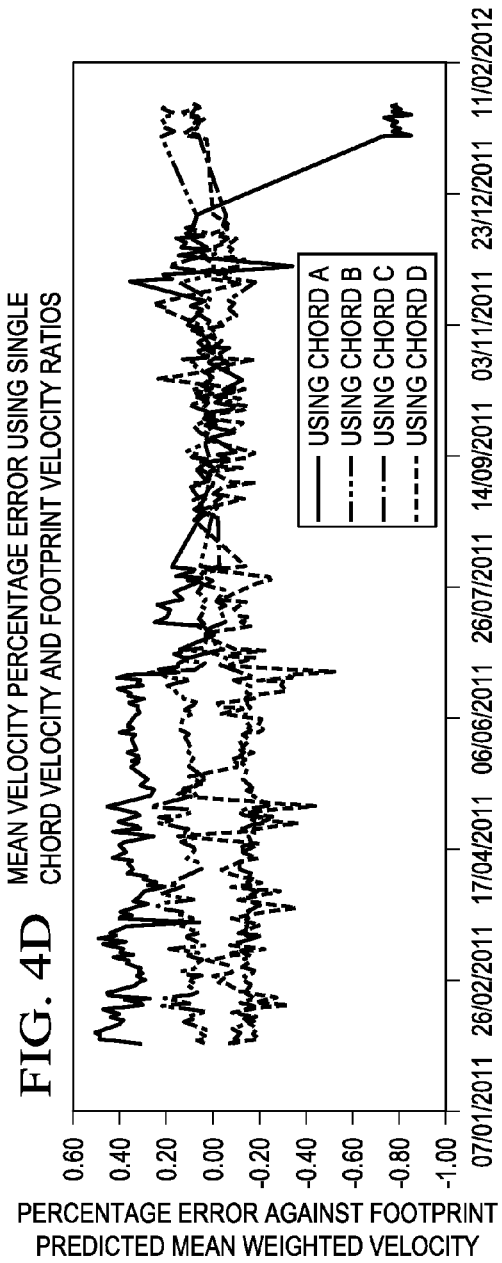

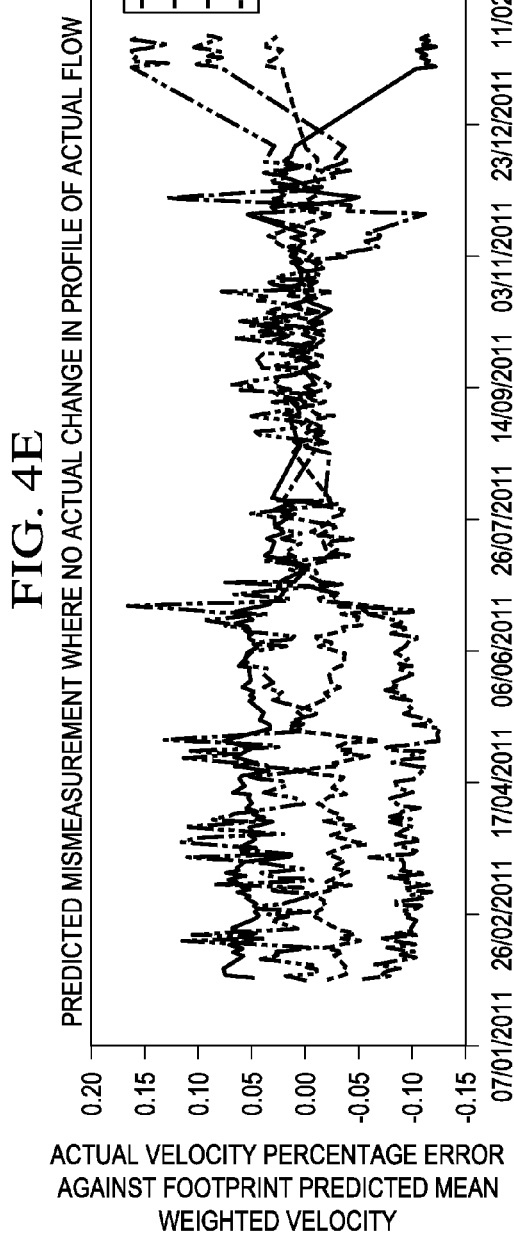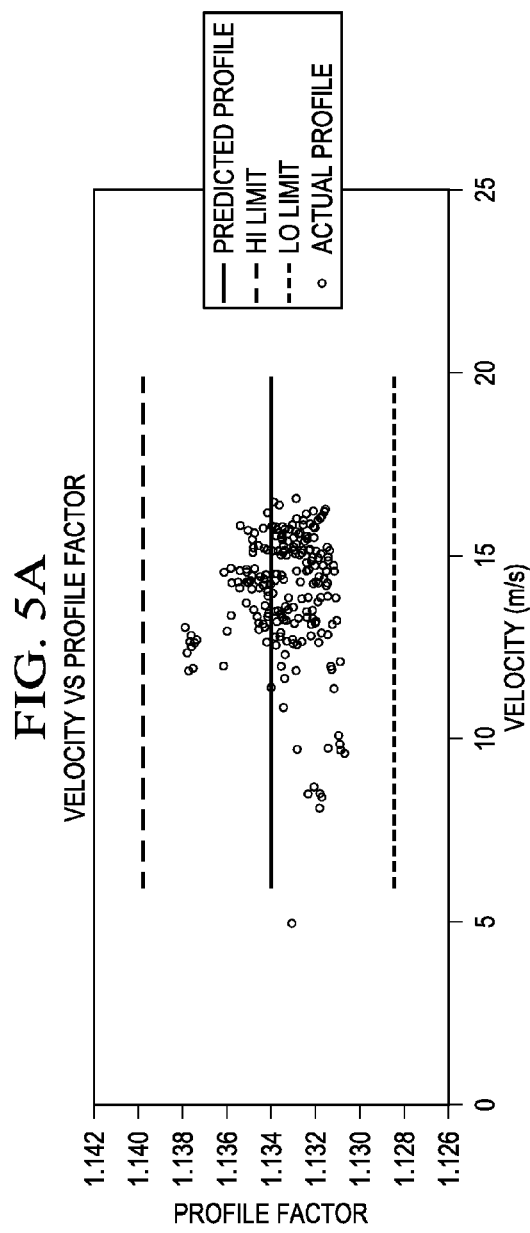

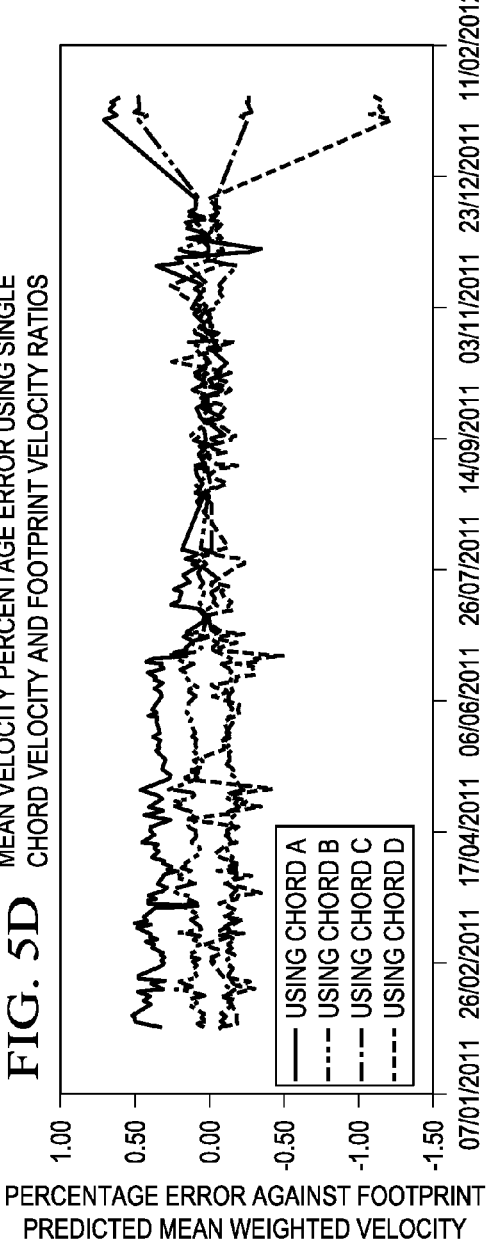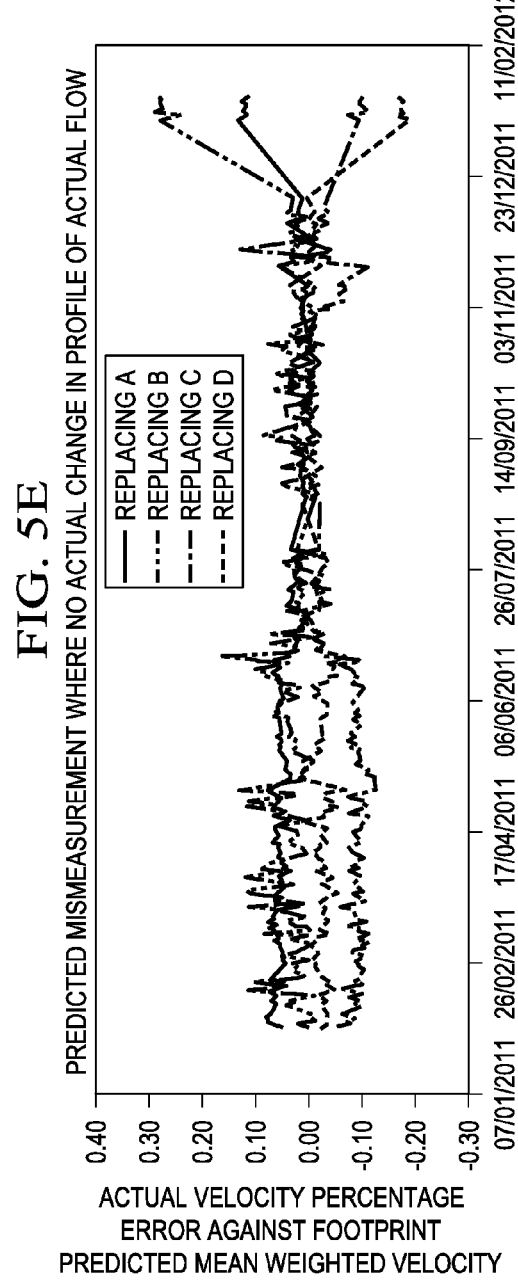

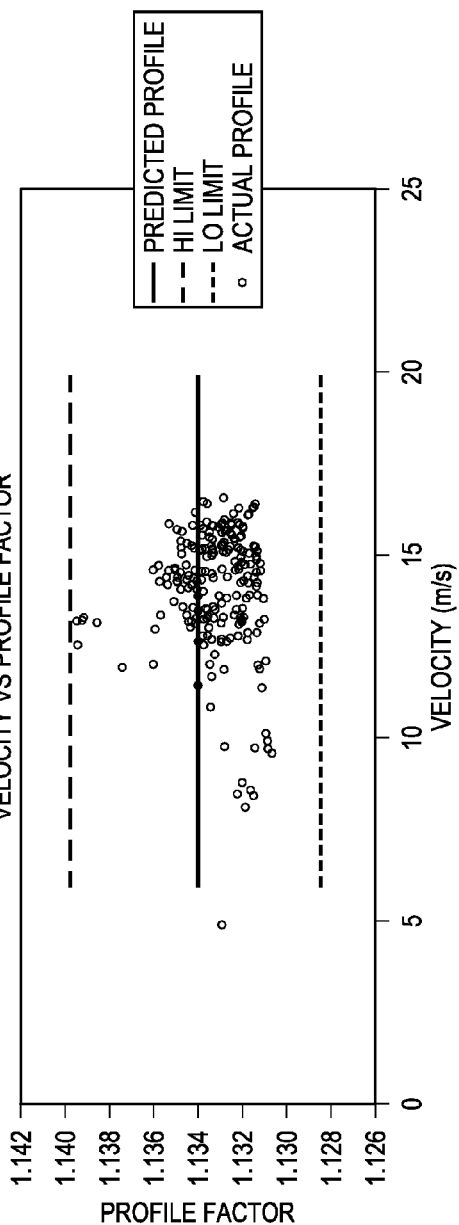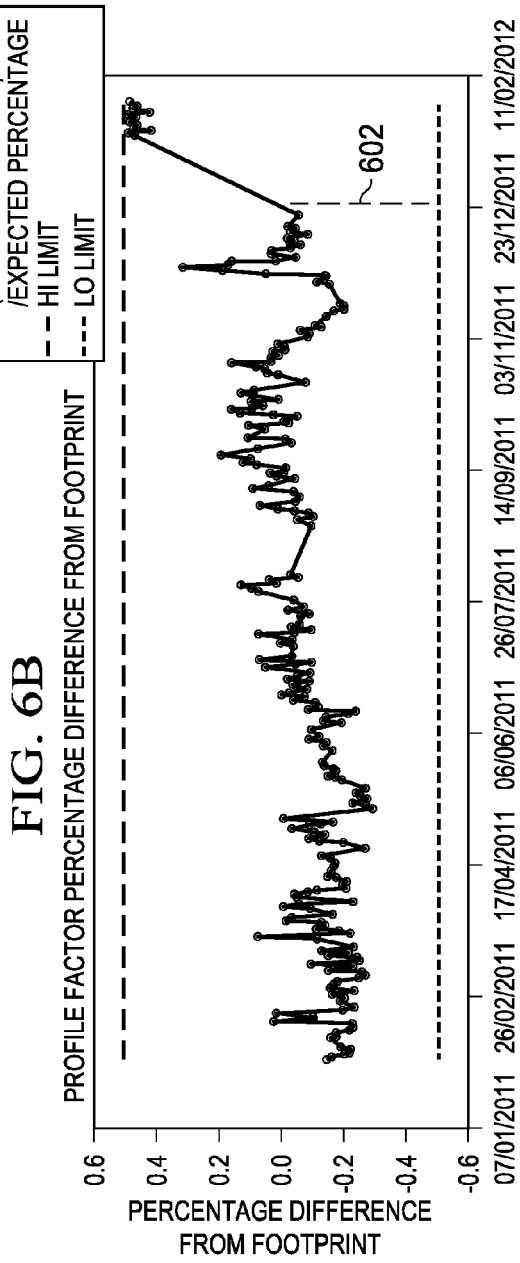

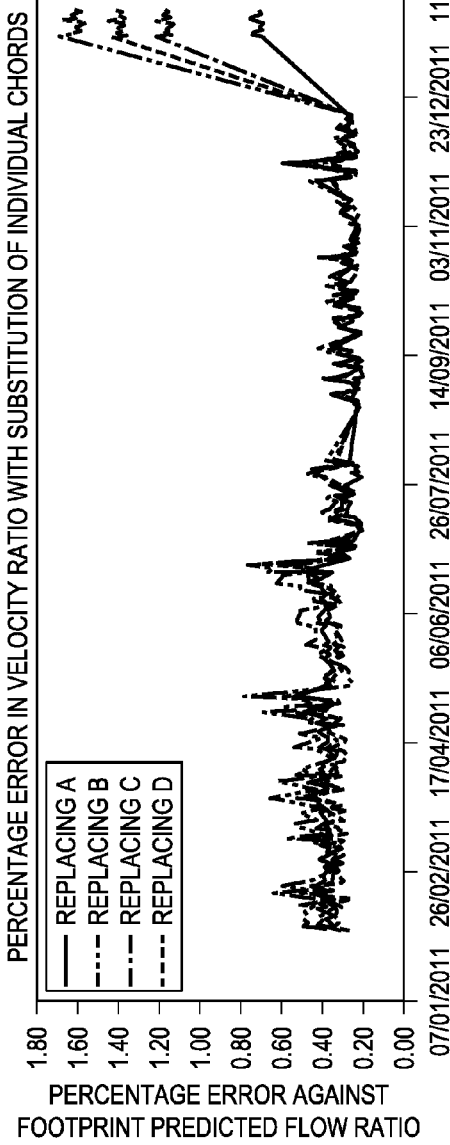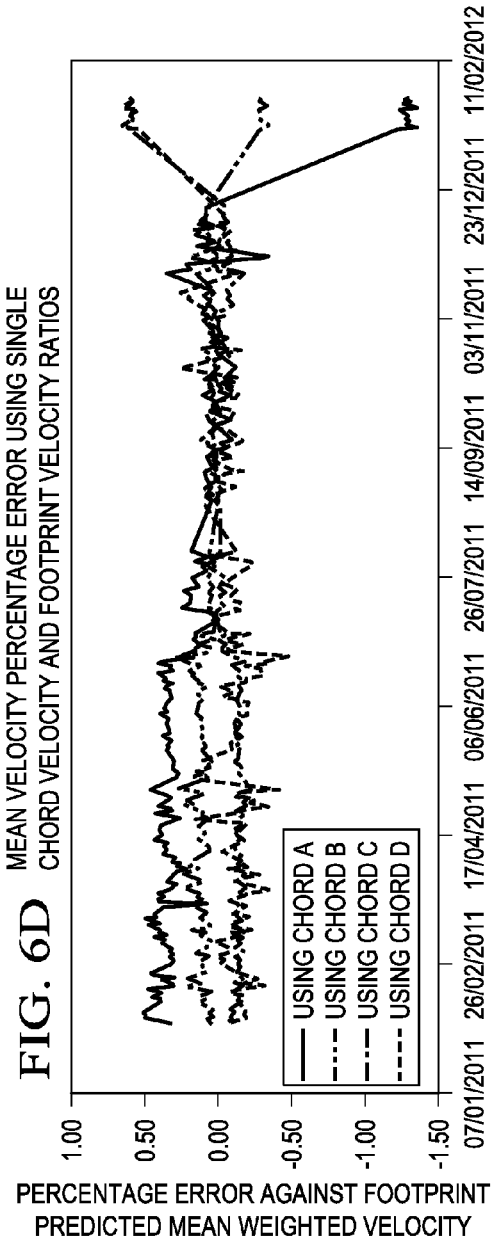

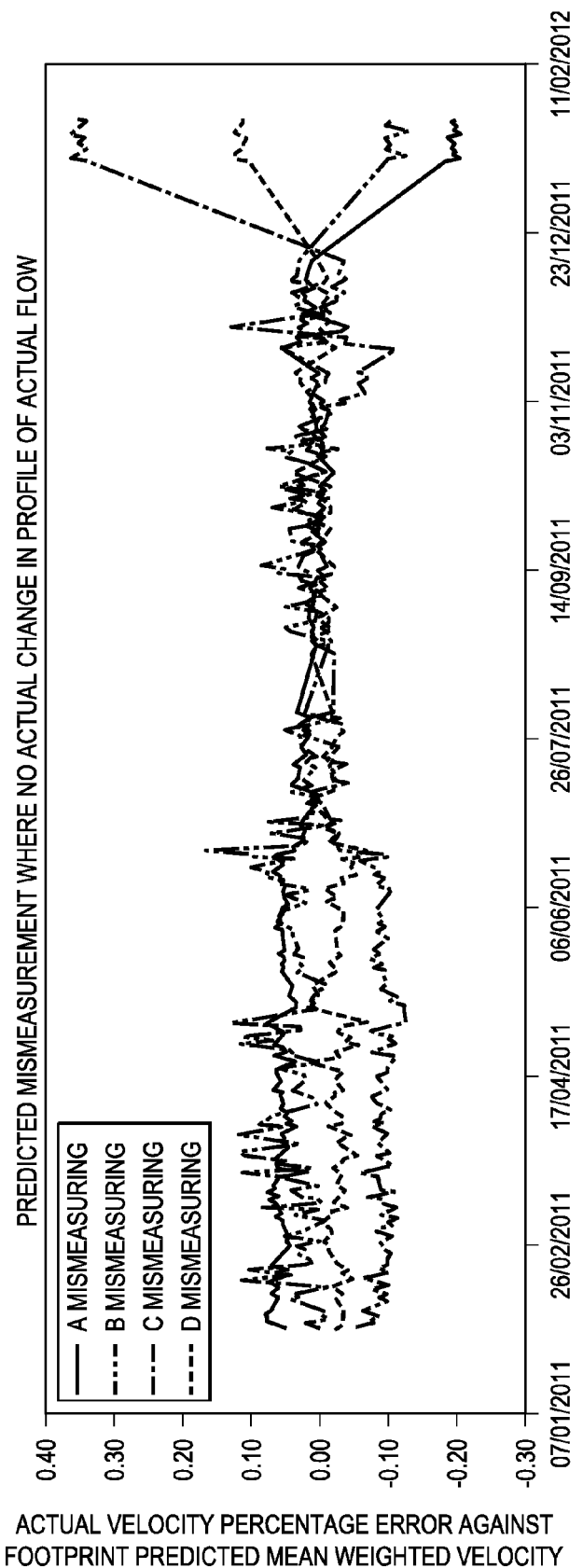

QUANTITATIVE ANALYSIS OF FLOW PROFILE CHARACTERISTICS FOR ULTRASONIC METERING SYSTEMS

CROSS-REFERENCE TO RELATED APPLICATION

The present application claims priority to U.S. Provisional Patent Application No. 61/716,167, filed on Oct. 19, 2012; which is hereby incorporated herein by reference in its entirety.

BACKGROUND

Natural gas is transported from place-to-place via pipelines. It is desirable to know with accuracy the amount of gas flowing in the pipeline, and particular accuracy is demanded when the fluid is changing hands, or "custody transfer." Even where custody transfer is not taking place, however, measurement accuracy is desirable, and in these situations, flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing through the meter can be determined from determined flow velocities and the known cross-sectional area of the flow meter.

An ultrasonic flow metering system is subject to various conditions that affect the calibration, accuracy, and/or operation of the metering system. For example, accumulation of contaminants in the pipeline, flow restrictions, and/or differences or changes in operating environment with respect to calibration environment may affect flow meter accuracy. Accordingly, effective techniques for monitoring conditions related to flow meter system operation and accuracy are desirable.

SUMMARY

Apparatus and methods for monitoring ultrasonic flow metering system operation are disclosed herein. In one embodiment, an ultrasonic flow metering system includes a condition monitor. The condition monitor is configured to determine a reference chordal velocity ratio for each of a plurality of chordal paths of an ultrasonic flow meter. The condition monitor is further configured, for each chordal path of the plurality of chordal paths, to compute: 1) a predicted chordal velocity for the chordal path, 2) a first estimated mean flow velocity for the ultrasonic meter, and 3) a predicted chordal velocity ratio for each other chordal path of the plurality of chordal paths. The predicted chordal velocity is based on the reference chordal velocity ratio for the chordal path and measured flow velocity for all other chordal paths of the plurality of chordal paths. The first estimated mean flow velocity is based on the predicted chordal velocity for the chordal path and the measured flow velocity for all other chordal paths of the plurality of chordal paths. The predicted chordal velocity ratio is based on the measured flow velocity for the other chordal path and the first estimated mean flow velocity.

In another embodiment, a method for monitoring operation of an ultrasonic flow metering system includes, for each chordal path of a plurality of chordal paths of an ultrasonic flow meter: 1) determining a reference chordal velocity ratio for the chordal path; 2) determining, for the chordal path, a predicted chordal velocity based on the reference chordal velocity ratio for the chordal path and measured flow velocities for all other chordal paths of the plurality of chordal paths; 3) determining a first estimated mean flow velocity for the ultrasonic meter, the first estimated mean flow velocity based on the predicted chordal velocity for the chordal path and the measured flow velocities for all other chordal paths of the plurality of chordal paths; and 4) determining, for each other chordal path of the plurality of chordal paths, a predicted chordal velocity ratio based on the measured flow velocity for the other chordal path and the first estimated mean flow velocity.

In a further embodiment, an ultrasonic flow metering system includes a condition monitor. The condition monitor is configured to determine a reference chordal velocity ratio for each of a plurality of chordal paths of an ultrasonic flow meter. The condition monitor is also configured to compute, for a first chordal path of the plurality of chordal paths, a first estimated mean flow velocity of the ultrasonic flow meter based on the measured velocity for the first chordal path and estimated chordal velocities for all other chordal paths of the plurality of chordal paths. The estimated chordal velocities are estimated based on the measured velocity for the first chordal path and calculated velocities for all other chordal paths of the plurality of chordal paths. The calculated velocities are calculated based on the measured velocity for the first chordal path and the reference chordal velocity ratios for all other chordal paths of the plurality of chordal paths.

In a yet further embodiment, a method for monitoring operation of an ultrasonic flow metering system includes determining a reference chordal velocity ratio for each of a plurality of chordal paths of an ultrasonic flow meter. The method further includes determining, for a first chordal path of the plurality of chordal paths, a first estimated mean flow velocity of the ultrasonic flow meter based on the measured velocity for the first chordal path and estimated chordal velocities for all other chordal paths of the plurality of chordal paths. The estimated chordal velocities are estimated based on the measured velocity for the first chordal path and calculated velocities for all other chordal paths of the plurality of chordal paths. The calculated velocities are calculated based on the measured velocity for the first chordal path and the reference chordal velocity ratios for all other chordal paths of the plurality of chordal paths.

BRIEF DESCRIPTION OF THE DRAWINGS

For a detailed description of exemplary embodiments of the invention, reference will now be made to the accompanying drawings in which:

FIGS. 4A-4E show illustrative flow profile information generated by a condition monitor for a shift in system conditions affecting a single chordal path in accordance with various embodiments;

FIGS. 5A-5E show illustrative flow profile information generated by a condition monitor for a change in site conditions in accordance with various embodiments;

FIGS. 6A-6E show illustrative flow profile information generated by a condition monitor for a shift in system conditions affecting two adjacent chordal paths in accordance with various embodiments;

NOTATION AND NOMENCLATURE

Figure 1:
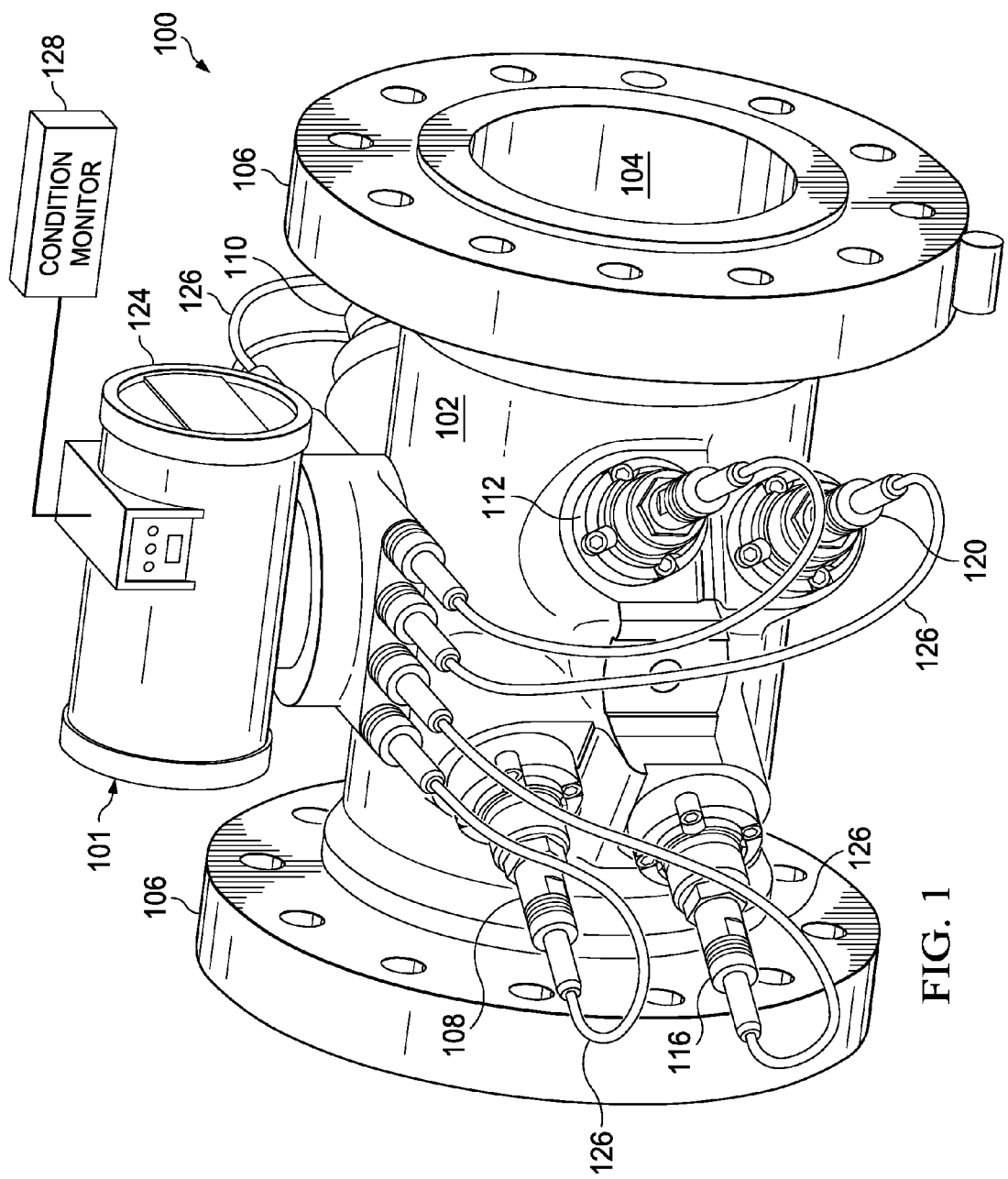
FIG. 1 shows an ultrasonic flow metering system in accordance with various embodiments.

In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct electrical connection. Thus, if a first device couples to a second device, that connection may be through a direct electrical connection, or through an indirect electrical connection accomplished via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The term "fluid" includes liquids and gases.

DETAILED DESCRIPTION

The following description is directed to various exemplary embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

Ultrasonic flow metering systems include condition monitors (e.g., condition-based monitoring systems) to enable detection of changes in metering system operation and/or system operating conditions, and correction of conditions causing the changes. An ultrasonic meter condition monitor is a system that monitors the operation of the ultrasonic meter and associated instrumentation. A condition monitor may analyze the operation of the metering system by performing exemplary functions such as:

detection of changes in flow characteristics such as flow profile, flow symmetry, flow swirl, flow turbulence, etc.

detection of changes in results of ultrasonic diagnostics such as error rate in the detection of ultrasonic signals, gain levels, noise levels, peakswitch detection, etc.

comparison of measured speed of sound from the ultrasonic flow meter to gas composition, pressure and temperature using the American Gas Association (AGA) 10 standard;

comparison of measured temperature against temperature derived from the speed of sound; and comparison of density derived from a gas composition sensor (e.g., a gas chromatograph) to density derived from speed of sound.

Conventional condition monitors compare reference values for velocity versus profile factor, crossflow, symmetry, gain or other velocity dependant characteristics to measured values of the parameter. The reference values are selected to reflect flow meter operational specifications and metering site characteristics such as upstream/downstream pipe design, vicinity of other equipment such as control valves, etc. Through such comparison, a condition monitor can detect a shift a flow profile or other monitored parameter. Unfortunately, the ramifications of a detected shift in flow profile cannot be ascertained via such qualitative measurements.

Flow characteristics may change for various reasons including changes in upstream processing methods or operating conditions, pipeline contamination, underdeveloped flow profile due to site design, etc. Investigation of these factors can be time consuming and costly. For example, investigation may require opening of a pressurized pipeline to check for contamination. Conventional analysis of flow profile shifts dictates elimination of all other factors before consideration of a flow meter fault due to the time and expense of flow meter verification and repair.

Embodiments of the present disclosure provide quantitative flow analyses that allow for on-site determination of the causes and effects of a shift in flow characteristics. Based on the causal information provided by the condition monitor disclosed herein, correction of an identified flow shift can be expedited. By quantifying the effects of a flow shift, embodiments may allow for determination of the likelihood that the cause of the shift can be ascertained and corrected. For example, the cause of an identified shift in flow profile falling within the range of flow meter operating specifications may be difficult or impossible to isolate, and consequently, expenditure of resources to find the cause may be unwarranted. Thus, embodiments of the condition monitor disclosed herein reduce the cost associated with operating a flow metering system by allowing for more precise identification of cause and effect of identified shifts in flow condition.

FIG. 1 shows an ultrasonic flow metering system 100 in accordance with various embodiments. The system 100 includes an ultrasonic flow meter 101, and a condition monitor 128. In the system 100, the ultrasonic flow meter 101 may be coupled to a pipe or other structure. The condition monitor 128 is coupled to the ultrasonic meter 101. In some embodiments, the condition monitor 128 may be part of a flow computer coupled to the ultrasonic meter 101. In other embodiments, the condition monitor 128 may be integrated with electronics 124 of the ultrasonic meter 101, or implemented as a discrete device.

The ultrasonic flow meter 101 includes a meter body or spool piece 102 that defines a central passage or bore. The spool piece 102 is designed and constructed to be coupled to a pipeline or other structure carrying fluids (e.g., natural gas) such that the fluids flowing in the pipeline travel through the central bore. While the fluids travel through the central bore, the ultrasonic flow meter 101 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 101 includes a plurality of transducer assemblies. In the view of FIG. 1, five such transducers assemblies 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More particularly, each transducer assembly is electrically coupled to the control electronics package 124 by way of a respective cable 126 or equivalent signal conducting assembly.

Figure 2:
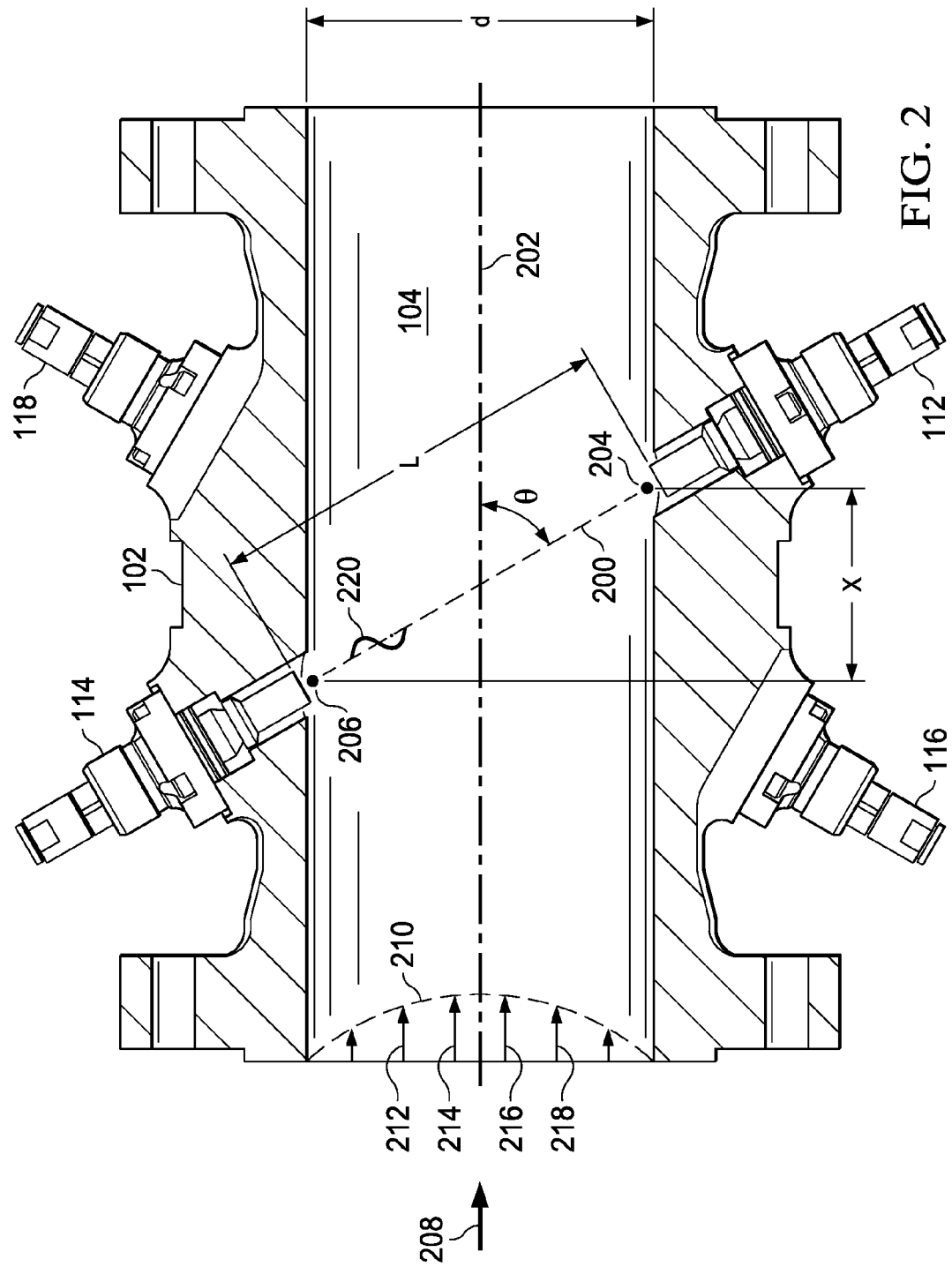
FIG. 2 shows a cross-sectional overhead view of an ultrasonic flow meter in accordance with various embodiments.

FIG. 2 shows a cross-sectional overhead view of the ultrasonic flow meter 101. Spool piece 102 has a predetermined size and defines the central bore 104 through which the measured fluid flows. An illustrative pair of transducer assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics 124 associated with the flow meter 101.

A path 200, also referred to as a "chord" or "chordal path" exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases, distances d, X, and L are precisely determined during flow meter fabrication. A measured fluid, such as natural gas, flows in a direction 208 with a velocity profile 210 (also known as a "flow profile"). Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 101 carrying the fluid, the average velocity over the area of the central bore 104 may be used to find the volume of fluid flowing through the spool piece 102.

Ultrasonic flow meters can have one or more chords. For example, the flow meter 101 includes four chordal paths at varying elevations within the spool piece 102. The flow velocity of the fluid may be determined at each chord to obtain chordal flow velocities, and the chordal flow velocities combined to determine an average flow velocity over the entire pipe. From the average flow velocity, the amount of fluid flowing in the spool piece, and thus the pipeline, may be determined.

Typically, the control electronics 124 causes the transducers (e.g., 112, 114) to fire and receives output signals from the transducers. The control electronics 124 may also compute the mean flow velocity for each chord, compute the mean flow velocity for the meter, compute the volumetric flow rate through the meter, compute speed of sound through the fluid, perform meter diagnostics, etc. The volumetric flow rate and other measured and computed values, such as flow velocity, speed of sound, etc. may be output to the condition monitor 128 or computed by the condition monitor 128. As noted above, the condition monitor 128 may be included in the control electronics 124 in some embodiments.

For a given chord, the chordal flow velocity v is given by:

$$v = \frac{L^2}{2X} \cdot \frac{T_{up} - T_{dn}}{T_{up} T_{dn}}, \quad (2)$$

and the chordal speed of sound c is given by:

$$c = \frac{L}{2} \cdot \frac{T_{up} + T_{dn}}{T_{up} T_{dn}}, \quad (3)$$

where:
L is the path length (i.e., face-to-face separation between upstream and downstream transducers),
X is the component of L within the meter bore in the direction of the flow, and
$T_{up}$ and $T_{dn}$ are the upstream and downstream transit times of sound energy through the fluid.

The average flow velocity through the meter 101 is given by:

$$V_{avg} = \sum_i w_i v_i \quad (4)$$

where:

$w_i$ is a chordal weighting factor, $v_i$ is the measured chordal flow velocity, and the summation i is over all chords.

Figure 3:
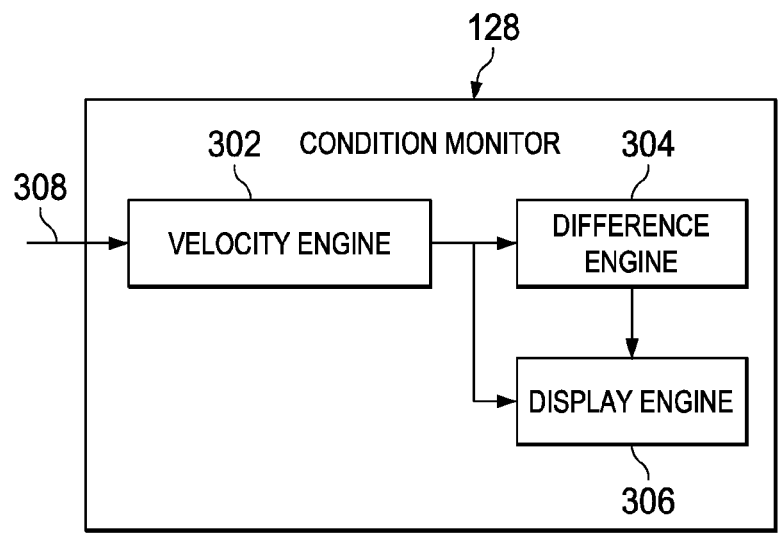
FIG. 3 shows a block diagram of a condition monitoring system in accordance with various embodiments.

FIG. 3 shows a block diagram of the condition monitor 128 in accordance with various embodiments. The condition monitor 128 includes a velocity engine 302, a difference engine 304, and a display engine 306. The velocity engine 302 acquires velocity measurements 308 for each chord of the ultrasonic meter 101, and generates reference values for use in flow analysis. The velocity engine 302 may generate profile factor values as a ratio of the flow velocities of the four chords of the flow meter 101 as:

$$ProfileFactor = \frac{ChordBVelocity + ChordCVelocity}{ChordAVelocity + ChordDVelocity}, \quad (5)$$

where the flow velocities of the chords are, for example, averages of measured chordal velocities obtained during a predetermined reference period. Profile factor values may be generated with respect to velocity.

The velocity engine 302 may also compute a reference chordal velocity ratio for each chord. The velocity engine 302 may compute the chordal velocity ratio as:

$$ChordalVelocityRatio = \frac{ChordalVelocity}{MeanChordalWeigthedVelocity}, \quad (6)$$

where:

ChordalVelocity is the flow velocity measured at the chord; and

MeanChordalWeightedVelocity is the meter velocity derived as a weighted average of measured chordal velocities.

The velocity engine 302 may establish a reference ChordalVelocityRatio for each chord, based on analysis of chordal velocity ratio over a reference period of time, where the ultrasonic metering system 100 is operating normally. The reference ChordalVelocityRatios are referred to herein as $RefVelocityRatio_{chordA}$, $RefVelocityRatio_{ChordB}$, $RefVelocityRatio_{ChordC}$, and $RefVelocityRatio_{ChordD}$ respectively for the four chords of the ultrasonic meter 101.

The velocity engine 302 computes various velocity estimate values for use in the analysis of flow conditions. The velocity engine 304 may compute a velocity estimate or expected velocity for each chord based on the chordal velocity ratio for the chord and the measured velocities of the other chords. Thus, considering the four chords of meter 101, the velocity engine 302 may compute a velocity estimate for chord A based on the chordal velocity ratio for chord A and the measured velocities of chords B, C, and D (i.e., without the measured velocity of chord A), and in similar fashion compute velocity estimates for chords B, C, and D.

The velocity engine 302 may compute such a velocity estimate for chord A as:

$$EstVelocity_{ChordA} = \quad (7)$$

$$\frac{RefVelocityRatio_{ChordA}(Velocity_{ChordB} + Velocity_{ChordC} + Velocity_{ChordD})}{(RefVelocityRatio_{ChordB} + RefVelocityRatio_{ChordC} + RefVelocityRatio_{ChordD})}.$$

Velocity estimates for chords B, C, and D can be similarly computed.

The velocity engine 302 can compute an estimated chord weighted velocity for the meter 101 based on estimated velocity for one chord and measured velocity for the other chords. Thus, the velocity engine 302 may compute an estimated chord weighted velocity based on the velocity estimate for chord A and measured velocities of chords B-D. The velocity engine 302 may compute the estimated chord weighted velocity based on the estimated velocity for chord A and the measured velocities of chords B-D as:

$$Velocity_{AvgSubChordA} = (EstVelocity_{ChordA} w_{ChordA}) + \sum_{j=ChordB}^{ChordD} w_j v_j, \quad (8)$$

where the weights w are the same weights as are applied in equation (4). Estimated chord weighted velocities for chords B-D may be similarly computed.

The velocity engine 302 may apply the estimated chord weighted velocity derived from the velocity estimate for chord A, as shown in equation (8) to compute predicted velocity ratios for chords B-D. For example, using $Velocity_{AvgSubChordA}$, a predicted chordal velocity ratio for chord B may be computed as:

$$ChordalVelocityRatio_{ChordBSubChordA} = \frac{ChordalVelocity_{ChordB}}{Velocity_{AvgSubChordA}} \quad (9)$$

Similarly, using the estimated chord weighted velocity for each chord, the velocity engine 302 computes a predicted chordal velocity ratio for each other chord.

For each chord, the difference engine 304 can compare the predicted velocity ratio to the reference velocity ratio and identify the largest difference across chords. For example, if predicted velocity ratios for chords B, C, D have been computed based on an estimated chord weighted velocity derived from the velocity estimate for chord A, the difference engine 304 can compute differences of predicted and reference velocity ratios for chords B-D and identify the largest of the differences. The difference engine 304 may compute a difference value for a chord (e.g., chord B) as:

$$RatioError_{ChordBSubChordA} = \quad (10)$$

$$\frac{RefVelocityRatio_{ChordB} - ChordalVelocityRatio_{ChordBChordASub}}{RefVelocityRatio_{ChordB}} \times 100\%.$$

The condition monitor 128 applies the differences to determine the cause of shift in flow characteristics.

FIGS. 4A-4C show data indicative of a change in flow profile and application thereof by the condition monitor 128 to isolate a cause of a shift in flow characteristics. FIG. 4A shows flow profile factor data from the meter 101 with established reference values and tolerance band. Chord A is under-reading in a portion of the dataset, but no information regarding chord A can be derived from FIG. 4A.

FIG. 4B shows the data points of FIG. 4A arranged in time sequence as difference values (percent difference) from the profile factor reference. FIG. 4B shows that a shift in flow characteristics occurs starting at about time 402. The shift is due to the under-reading of chord A, but as in FIG. 4A, no information regarding chord A can be derived from FIG. 4B.

FIG. 4C shows maximum identified differences between predicted and reference velocity ratios using estimated chord weighted velocity for each chord as described above with regard to equation (10). The data labeled "Replacing A" represents the maximum difference values of chords B, C, and D when using chord A replacement in the estimated chord weighted velocity. Similarly, the data labeled "Replacing B" represents the maximum difference values of chords A, C, and D when using chord B replacement in the estimated chord weighted velocity, and so on. The data of FIG. 4C shows that the difference values for chords B, C, and D remain low (i.e., within normal velocity ratio range) when replacing chord A in the estimated chord weighted velocity, but increase when replacing B, C, or D. Thus, the condition monitor 128 or an operator can determine, based on the data of FIG. 4C, that the shift in flow conditions at time 402 is affecting chord A. By isolating the shift to chord A, the resource applied to identify and/or correct the cause of the shift may be reduced.

The analysis technique described above is based on replacing one chord at a time in conjunction with measurements from each other chord. The velocity engine 302 may also compute predicted velocity for each chord based on the measured velocity of a single chord and the reference velocity ratios for each chord. The velocity engine 302 computes an estimated mean chordal-weighted velocity based on the predicted velocities and the single measured velocity. Thus, based on the measured velocity of chord A and the reference velocity ratios for chords B-D, the velocity engine 302 computes the predicted velocities of chords B-D, and computes a corresponding mean chordal-weighted velocity for the meter 101 based on the predicted velocities of chords B-D and the measured velocity of chord A. For example, the velocity engine 302 may compute a mean chordal-weighted velocity value based only on chord A as:

$$Velocity_{AvgChordAOnly} = \frac{Velocity_{ChordA}}{RefVelocityRatio_{ChordA}} \quad (11)$$

The velocity engine 302 may compute such mean chordal-weighted velocity using each single measured chordal velocity and associated reference velocity ratio.

The difference engine 304 compares the mean chordal-weighted velocity based on a single measured chord to the measured mean chordal-weighted velocity for the meter 101, which includes measured velocities for all chords. FIG. 4D shows the difference values (percent difference) generated by the difference engine 304 for each mean chordal-weighted velocity using a single measured chord. In FIG. 4D, using chord B, C or D measurements produces differences within an acceptable level when compared against historical difference values, all have similar offsets, indicating that the velocity would be slightly higher if using any of chords B, C or D. However, differences derived using chord A produce a significantly different result from the other chords, and indicate that the overall velocity would be substantially lower. Thus, the data of FIG. 4D reinforces the conclusion that either chord A is not working correctly and is under-reading, or a change in site conditions affecting the flow profile seems related to only chord A.

As explained above, the velocity engine 302 can compute an estimated chord weighted velocity for the meter 101 based on estimated velocity for one chord and measured velocity for the other chords (equation (8)). The difference engine 304 compares the estimated chord weighted velocity to the measured chord weighted velocity (i.e., chord weighted velocity computed using measured velocities for all chords). The difference values produced by the comparison provide, for the replaced chord, a measure of the percentage error in the overall metering. FIG. 4E shows difference values generated by the difference engine 304 for mean chordal-weighted velocities produced for each chord.

The difference data of FIG. 4E provides a qualitative assessment of the effects of the flow shift. While the flow profile has been adversely affected by the misreading in chord A, as shown in FIG. 4E, the effect of the misreading is that the ultrasonic meter 101 is under-reading by only about 0.12%. If the uncertainty caused by the flow shift is within operational tolerances (e.g., 1% uncertainty for gas metering), then expenditure of resources to identify and/or correct the problem may be unnecessary. Additionally, because uncertainties at accredited laboratories may exceed the uncertainty of the misreading (e.g., accredited lab uncertainty may be in the range of 0.15% to 0.26%), attempts to identify the 0.12% uncertainty of FIG. 4E may not be successful.

Figure 5B:
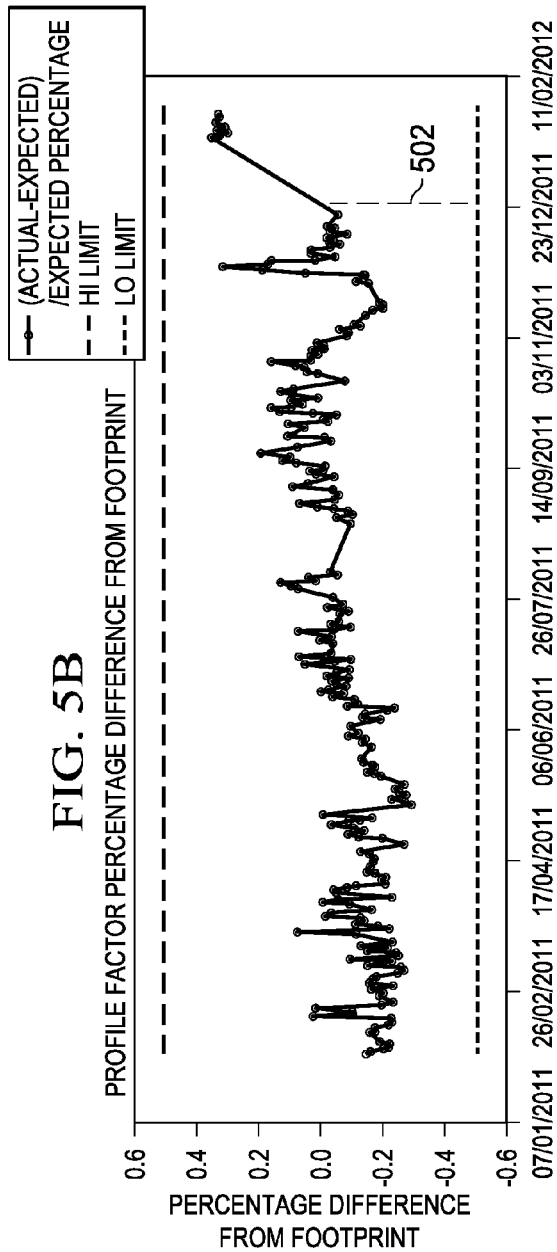

FIGS. 5A-5E show illustrative flow profile information generated by the condition monitor 128 for a change in site conditions in accordance with various embodiments. FIG. 5A shows flow profile factor data from the meter 101, with established reference values and tolerance band. The data of FIG. 5A is similar to the data of FIG. 4A, but rather than a single chord misreading, the site characteristics have changed. However, no information regarding the cause or nature of a shift in flow characteristics can be derived from FIG. 5A.

FIG. 5B shows the data points of FIG. 5A arranged in time sequence as difference values (percent difference) from the profile factor reference. FIG. 5B shows that a shift in flow characteristics occurs starting at about time 502. The shift is due to the change in site conditions, but as in FIG. 5A, no information regarding the cause of the shift can be derived from FIG. 5B.

Figure 5C:
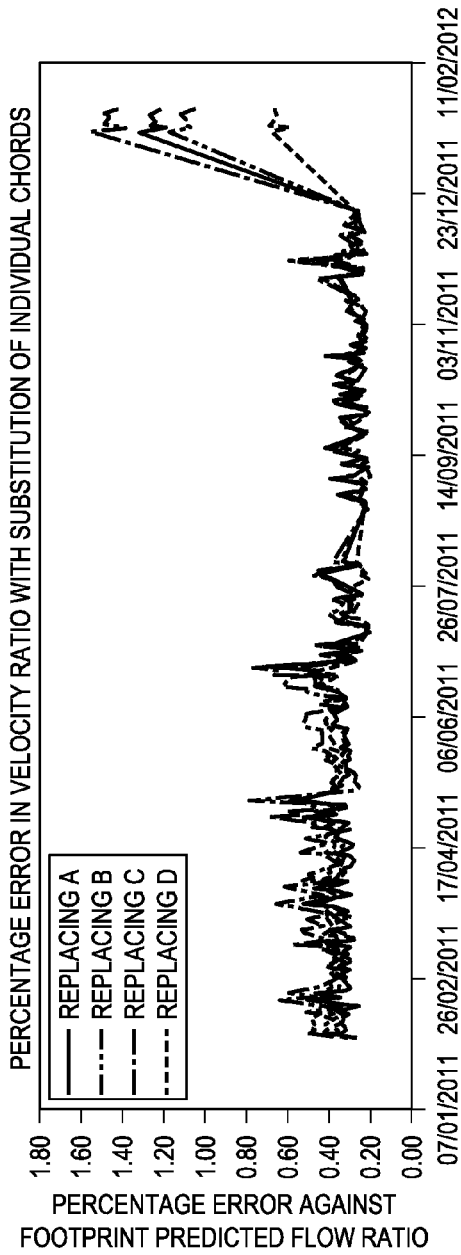

FIG. 5C shows maximum identified differences between predicted and reference velocity ratios using estimated chord weighted velocity for each chord as described above. The data shows that none of the chord ratios are consistent with the corresponding references. Thus, the condition monitor 128 can determine, because it is unlikely that a common mode failure affects all chords, that the meter 101 is not mismeasuring, but that a change in site conditions caused the shift in flow characteristics.

FIG. 5D shows the difference values (percent difference) generated by the difference engine 304 for each mean chordal-weighted velocity using a single measured chord. FIG. 5D shows that none of the chords provides results in accordance with the reference values. Thus, the data of FIG. 5D supports the conclusion that the shift in flow characteristics is caused by a change in site conditions rather than meter mismeasurement.

Based on the information provided by FIGS. 5C and 5D, the cause of the change in site conditions can be investigated. If the change in site conditions is not correctable, then the change in flow characteristics can be accepted and flow reference values reset in accordance with the changed flow conditions.

FIG. 5E shows difference values generated by the difference engine 304 for mean chordal-weighted velocities produced for each chord. In FIG. 5E, uncertainty data based on individual chord misreadings are also scattered above and below the zero error line. Comparison of FIG. 5E to FIG. 4E, and similarly FIG. 4C to FIG. 5C, and FIG. 4D to FIG. 5D, shows that the analysis provided by the condition monitor 128 makes possible a determination of the cause of a profile shift.

FIGS. 6A-6E show illustrative flow profile information generated by the condition monitor 128 for a shift in system conditions affecting two adjacent chordal paths in accordance with various embodiments. FIG. 6A shows flow profile factor data from the meter 101, with established reference values and tolerance band. The data of FIG. 6A is similar to the data of FIG. 4A, but rather than a single chord misreading, two chords are misreading. However, no information regarding the cause or nature of a shift in flow characteristics can be derived from FIG. 6A.

FIG. 6B shows the data points of FIG. 6A arranged in time sequence as difference values (percent difference) from the profile factor reference. FIG. 6B shows that a shift in flow characteristics occurs starting at about time 602. The shift is due to misreading in chords A and B, but as in FIG. 6A, no information regarding the cause or nature of the shift can be derived from FIG. 6B.

FIG. 6C shows maximum identified differences between predicted and reference velocity ratios using estimated chord weighted velocity for each chord as described above. The data shows that no single chord is causing the shift in flow characteristics because the single chord replacement employed to generate the data of FIG. 6C fails to produce chordal data consistent with the reference flow profile.

FIG. 6D shows the difference values (percent difference) generated by the difference engine 304 for each mean chordal-weighted velocity using a single measured chord. FIG. 6D shows that chords C and D show consistency and indicate based on the corresponding references that the flow should be higher than is being measured. Based on the data for chords A and B, it is apparent that the A chord is being influenced more significantly than the B chord, but that both Chords have been influenced.

Based on the information provided by FIGS. 6C and 6D, it can be determined that, because multiple chords are affected, the change in flow characteristics is due to a change in site conditions rather than a fault in the ultrasonic meter 101. The data further indicates that the cause may be a blockage or contamination near the top of the pipe, which is having a more marked influence on chord A than chord B.

As disclosed above, quantitative analysis of mismeasurement can be applied to determine whether a single chord is mismeasuring, or whether multiple chords are affected concurrently, which may be indicative of changes in site conditions. FIGS. 4E, 5E, and 6E show the predicted mismeasurement introduced in the overall measurement by measurement error of a single chord. Thus, embodiments provide a predicted quantity of mismeasurement based on an assumption that the mismeasurement is due to a chordal misbehaviour rather than a physical change in the operating conditions. Based on the predicted mismeasurement, a user or system can determine whether the quantity, and hence commercial value, of the mismeasurement justifies further investigations.

Those skilled in the art will understand that the predicted mismeasurement techniques disclosed herein can be further expanded to include the analysis of predicted mismeasurement where more than one chord is assumed to be in error. The present disclosure encompasses all such variants of multiple chord error analysis which employ techniques similar to those previously described but provide predicted mismeasurement where multiple chords are assumed to be mismeasuring rather than a single chord, as shown in FIGS. 4E, 5E and 6E.

Returning now to FIG. 3, the display engine 306 generates displays for presentation of information provided by the velocity engine 302 and the difference engine 304 for presentation to a user. For example, the display engine 404 may generate a displays of values as shown in any of FIGS. 4A-4E and described herein. The display engine 306 may present the display via a monitor as is known in the art (e.g., a flat panel monitor), a printer, or other display device.

Embodiments of the velocity engine 302, the difference engine 304, and the display engine 306 may include hardware resources, or hardware and software resources (i.e., instructions) to perform the functions disclosed herein. For example, some embodiments of the velocity engine 302, the difference engine 304, and the display engine 306 may be implemented as one or more processors executing instructions retrieved from a computer-readable storage medium. Processors suitable for implementing the engines 302, 304, 306 may include general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. A non-transitory computer-readable storage medium suitable for storing instructions of the engines 302, 304, 306 may include volatile storage such as random access memory, non-volatile storage (e.g., a hard drive, an optical storage device (e.g., CD or DVD), FLASH storage, read-only-memory), or combinations thereof.

Some embodiments of the velocity engine 302, the difference engine 304, and the display engine 306 may be implemented as hardware circuitry configured to perform the functions disclosed herein. Selection of a hardware or processor/instruction implementation of embodiments is a design choice based on a variety of factors, such as cost, time to implement, and the ability to incorporate changed or additional functionality in the future.

Figure 7:
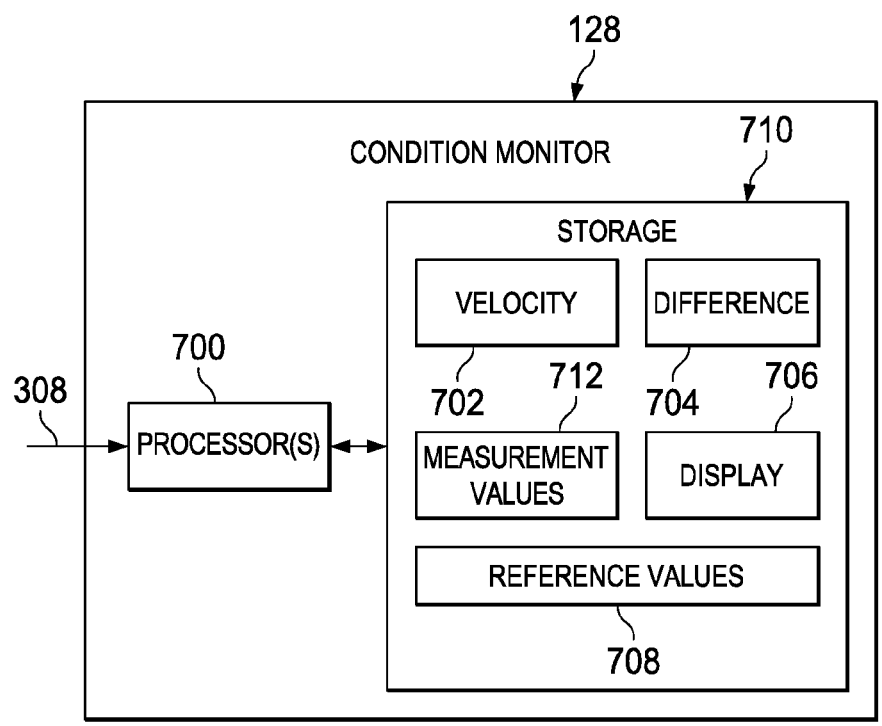
FIG. 7 shows a block diagram of a processor-based embodiment of a condition monitor in accordance with various embodiments.

FIG. 7 shows a block diagram of a processor-based embodiment of the condition monitor 128. The embodiment of the condition monitor 128 shown in FIG. 7 includes a processor 700 and storage 710 coupled to the processor 700. The processor 700 is an instruction execution device as described above. The storage 710 is a computer-readable medium as described above. The processor 700 retrieves and executes instructions stored in the storage 710, reads data from the storage 710, writes data to the storage 710, and communicates with other systems and devices. The storage 710 includes a velocity module 702, a difference module 704, and a display module 706 which respectively include instructions for implementing the velocity engine 302, the difference engine 304, and the display engine 306. The storage 710 may also include processed and/or unprocessed measurement values 712 (e.g., velocity measurements, velocity estimates, etc.), and reference values 708 that correspond to the reference velocity ratios, reference mean flow velocities, etc. The processor-based condition monitor 128 shown in FIG. 7 may include various other components, such as network adapters, video interfaces, peripheral interfaces, etc. that have been omitted from FIG. 7 in the interest of clarity.

Figure 8:
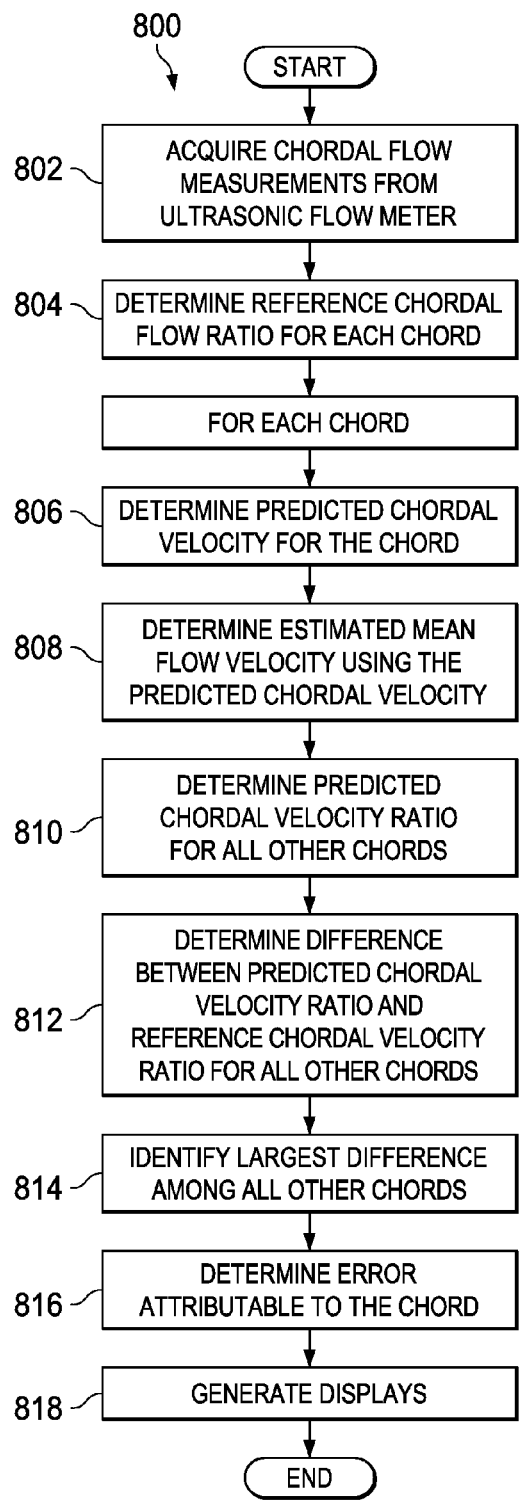
FIG. 8 shows a flow diagram for a method for analyzing flow profile based on single chord estimation in accordance with various embodiments.

FIG. 8 shows a flow diagram for a method for analyzing flow profile based on single chord estimation in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 800, as well as other operations described herein, can be implemented as instructions stored in computer readable medium 710 and executed by the processor 700.

In block 802, fluid is flowing through the ultrasonic flow metering system 100, and the system 100 is measuring the volume of the fluid. The condition monitor 128 acquires flow velocity measurements for each chord of the ultrasonic flow meter 101. The ultrasonic flow meter 101 may provide the measurements to the condition monitor 128, or the condition monitor 128 may compute the chordal flows base on measurement information provided by the ultrasonic flow meter 101.

In block 804, the condition monitor 128 determines reference values to be used in the analysis of flow conditions. The condition monitor 128 may establish a reference chordal velocity ratio for each chord, a reference mean flow velocity for the meter 101, a reference profile factor, etc. The reference values may be based on averages of flow values over a reference initialization interval.

For each chord of the ultrasonic flow meter 101, the condition monitor 128 generates flow data that replaces measured velocity for the chord with a computed velocity, and generates flow data for the other chords (i.e., not the replaced chord) based on the replaced velocity. Accordingly, in block 806, the condition monitor 128 determines a predicted chordal velocity for the chord (i.e., the chord being replaced (e.g., chord A)). The condition monitor 128 determines the predicted chordal velocity based on the reference chordal velocity ratio for the chord and the measured velocities for all other chords (e.g., chords B, C, and D).

In block 808, the condition monitor 128 determines an estimated mean flow velocity for the ultrasonic flow meter 101. The condition monitor 128 determines the estimated mean flow velocity based on the predicted chordal velocity for the chord (e.g., chord A) and the measured velocities for all other chords (e.g., chords B-D).

In block 810, the condition monitor 128 determines predicted chordal velocity ratios for all other chords (e.g., chords B-D) based on the estimated mean flow velocity and the measured velocity for each of the all other chords.

In block 812, the condition monitor 128, for each of the all other chords, determines the difference between the predicted chordal velocity ratio and the reference chordal velocity ratio. The difference may be expressed as a percent difference.

In block 814, the condition monitor 128 compares the differences for the all other chords and identifies the largest difference value for each time interval (e.g., the largest of B, C, and D differences corresponding to a given time).

In block 816, the condition monitor 128 determines measurement error attributable to the replaced chord. The condition monitor 128 determines measurement error based on the predicted chordal velocity for the chordal path and the measured flow velocity for each other chordal path. For example, the condition monitor 128 may determine the difference between the estimated mean flow velocity using the predicted chordal velocity and the measured velocity (e.g., percent difference). Having identified the largest difference values and measurement error corresponding to the chord replaced, the condition monitor 128 proceeds to process the next chord in accordance with blocks 806-814.

In block 816, the condition monitor 128 displays the identified largest values and/or the measurement error identified for each chord replacement.

Figure 9:
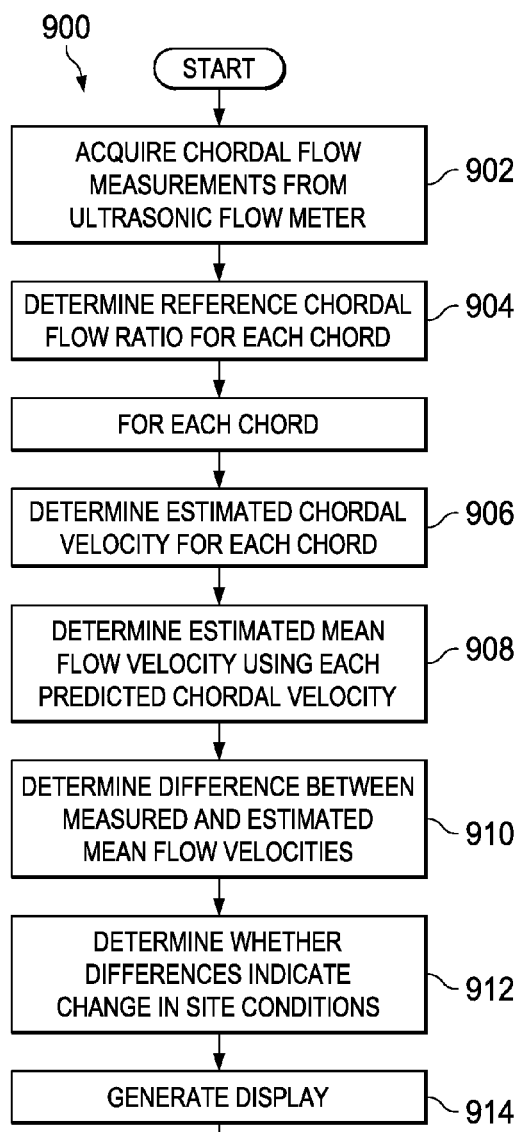
FIG. 9 shows a flow diagram for a method for analyzing flow profile based estimation of all except a single chord in accordance with various embodiments.

FIG. 9 shows a flow diagram for a method for analyzing flow profile based on multiple chord estimation in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 900, as well as other operations described herein, can be implemented as instructions stored in computer readable medium 710 and executed by the processor 700.

In block 902, fluid is flowing through the ultrasonic flow metering system 100, and the system 100 is measuring the volume of the fluid. The condition monitor 128 acquires flow velocity measurements for each chord of the ultrasonic flow meter 101. The ultrasonic flow meter 101 may provide the measurements to the condition monitor 128, or the condition monitor 128 may compute the chordal flows base on measurement information provided by the ultrasonic flow meter 101.

In block 904, the condition monitor 128 determines reference values to be used in the analysis of flow conditions. The condition monitor 128 may establish a reference chordal velocity ratio for each chord, a reference mean flow velocity for the meter 101, etc. The reference values may be averages of a flow value over a reference initialization interval.

For each chord of the ultrasonic flow meter 101, the condition monitor 128 generates an estimated mean flow velocity for the ultrasonic flow meter 101 based on the measured velocity of the chord and the reference velocity ratios for all chords. Accordingly, in block 906, the condition monitor 128 determines a predicted chordal velocity for all other chords with respect to a given chord. That is, if the estimated mean flow velocity is being determined with respect to chord A (the given chord), then predicted chordal velocities are determined for chords B, C, and D. The condition monitor 128 determines the predicted chordal velocity for each of the other chords based on the measured velocity for the given chord and the reference velocity ratio for the other chord.

In block 908, the condition monitor 128 determines the estimated mean flow velocity for the given chord based on the measured velocity for the given chord and the predicted velocities for all other chords.

In block 910, the condition monitor 128 determines the difference between the estimated mean flow velocity and the measured mean flow velocity. The difference may a percent difference. Having determined the difference values for the given chord, the condition monitor 128 proceeds to process the next chord in accordance with blocks 906-910.

In block 912, the condition monitor 128 evaluates the difference values produced for each chordal path and determines whether the differences are indicative of a change in site conditions. For example, if the difference values of a single chord are within range of historic levels, then the cause of a shift in flow characteristics may be a change in site conditions or a fault in the ultrasonic meter related to the single chord, otherwise the cause of the shift in flow characteristics may more likely be a change in site conditions affecting multiple chords.

In block 914, the condition monitor 128 displays the difference value computed for each chordal path.

Embodiments of the condition monitor 128 may apply operations of the methods 800 and 900 alone or in conjunction to analyze the shift in flow characteristics.

The above discussion is meant to be illustrative of the principles and various exemplary embodiments of the present invention. Numerous variations and modifications will become apparent to those skilled in the art once the above disclosure is fully appreciated. It is intended that the following claims be interpreted to embrace all such variations and modifications.

What is claimed is:

1. An ultrasonic flow metering system, comprising:
   an ultrasonic flow meter comprising:
      a spool piece defining a central passage for fluid flow;
      a plurality of pairs of ultrasonic transducers disposed in the spool piece, each of the pairs of ultrasonic transducers disposed to form a chordal path across the central passage; wherein the ultrasonic flow meter comprises a plurality of chordal paths;
   a condition monitor configured to:
      determine a reference chordal velocity ratio for each of the plurality of chordal paths;
      for each chordal path of the plurality of chordal paths:
         compute, for the chordal path, a predicted chordal velocity based on the reference chordal velocity ratio for the chordal path and measured flow velocities for all other chordal paths of the plurality of chordal paths;
         compute a first estimated mean flow velocity for the ultrasonic meter, the first estimated mean flow velocity based on the predicted chordal velocity for the chordal path and the measured flow velocities for all other chordal paths of the plurality of chordal paths; and
         compute, for each other chordal path of the plurality of chordal paths, a predicted chordal velocity ratio based on the measured flow velocity for the other chordal path and the first estimated mean flow velocity.

2. The system of claim 1, wherein the condition monitor is configured to, for each other chordal path of the plurality of chordal paths:
   compute a difference between the predicted velocity ratio and the reference chordal velocity ratio for the other chordal path; and
   identify a largest of the differences across the other chordal paths of the plurality of chordal paths.

3. The system of claim 2, wherein the condition monitor is configured to generate, for each chordal path, a display of the largest difference.

4. The system of claim 1, wherein the condition monitor is configured to compute, for each chordal path, a degree of measurement error attributable to the chordal path based on the predicted chordal velocity for the chordal path and the measured flow velocity for all other chordal paths.

5. The system of claim 1, wherein the condition monitor is configured to:
   compute, for a first chordal path of the plurality of chordal paths, a second estimated mean flow velocity of the ultrasonic flow meter based on the measured velocity for the first chordal path and estimated chordal velocities for all other chordal paths of the plurality of chordal paths, the estimated chordal velocities estimated based on the measured velocity for the first chordal path and calculated velocities for all other chordal paths of the plurality of chordal paths, the calculated velocities calculated based on the measured velocity for the first chordal path and the reference chordal velocity ratios for all other chordal paths of the plurality of chordal paths.

6. The system of claim 5, wherein the condition monitor is configured to:
   compute the second estimated mean flow velocity of the ultrasonic flow meter with each chordal path of the plurality of chordal paths successively being the first chordal path; and
   compute, for each chordal path of the plurality of chordal paths, a difference between the second estimated mean flow velocity and a measured mean flow velocity.

7. The system of claim 6, wherein the condition monitor is configured to generate, for each chordal path of the plurality of chordal paths, a display of the difference.

8. The system of claim 6, wherein the condition monitor is configured to determine whether the differences are indicative of a change in site conditions.

9. A method for monitoring operation of an ultrasonic flow metering system, comprising:
   in an ultrasonic flow meter comprising a spool piece defining a central passage for fluid flow; and a plurality of pairs of ultrasonic transducers disposed in the spool piece, each of the pairs of ultrasonic transducers disposed to form a chordal path across the central passage; wherein the ultrasonic flow meter comprises a plurality of chordal paths:
      for each of the chordal paths:
         determining, for the chordal path, a reference chordal velocity ratio;
         determining, for the chordal path, a predicted chordal velocity based on the reference chordal velocity ratio for the chordal path and measured flow velocities for all other chordal paths of the plurality of chordal paths;
         determining a first estimated mean flow velocity for the ultrasonic meter, the first estimated mean flow velocity based on the predicted chordal velocity for the chordal path and the measured flow velocities for all other chordal paths of the plurality of chordal paths;
         determining, for each other chordal path of the plurality of chordal paths, a predicted chordal velocity ratio based on the measured flow velocity for the other chordal path and the first estimated mean flow velocity.

10. The method of claim 9, further comprising, for each other chordal path of the plurality of chordal paths:
   determining, for the other chordal path, a difference between the predicted velocity ratio for the other chordal path and the reference chordal velocity ratio for the other chordal path; and identifying a largest of the differences across the other chordal paths.

11. The method of claim 9, further comprising determining, for each chordal path, a degree of measurement error attributable to the chordal path based on the predicted chordal velocity for the chordal path and the measured flow velocity for all other chordal paths.

12. The method of claim 9, further comprising determining, for a first chordal path of the plurality of chordal paths, a second estimated mean flow velocity of the ultrasonic flow meter based on the measured velocity for the first chordal path and estimated chordal velocities for each other chordal path of the plurality of chordal paths, the estimated chordal velocities estimated based on the measured velocity for the first chordal path and calculated velocities for all other chordal paths of the plurality of chordal paths the calculated velocities calculated based on the measured velocity for the first chordal path and the reference chordal velocity ratios for all other chordal paths of the plurality of chordal paths.

13. The method of claim 12, further comprising:
determining, the second estimated mean flow velocity of the ultrasonic flow meter with each chordal path of the plurality of chordal paths successively serving as the first chordal path; and
determining, for each chordal path of the plurality of chordal paths, a difference between the second estimated mean flow velocity and a measured mean flow velocity.

14. The method of claim 13, further comprising determining whether the differences are indicative of a change in site conditions based on relative trends in velocity change of the chordal paths.

15. An ultrasonic flow metering system, comprising:
an ultrasonic flow meter comprising:
a spool piece defining a central passage for fluid flow;
a plurality of pairs of ultrasonic transducers disposed in the spool piece, each of the pairs of ultrasonic transducers disposed to form a chordal path across the central passage; wherein the ultrasonic flow meter comprises a plurality of chordal paths; and
a condition monitor configured to:
determine a reference chordal velocity ratio for each of a plurality of chordal paths of an ultrasonic flow meter; and
compute, for a first chordal path of the plurality of chordal paths, a first estimated mean flow velocity of the ultrasonic flow meter based on the measured velocity for the first chordal path and estimated chordal velocities for all other chordal paths of the plurality of chordal paths, the estimated chordal velocities estimated based on the measured velocity for the first chordal path and calculated velocities for all other chordal paths of the plurality of chordal paths, the calculated velocities calculated based on the measured velocity for the first chordal path and the reference chordal velocity ratios for all other chordal paths of the plurality of chordal paths.

16. The system of claim 15, wherein the condition monitor is configured to:
compute the first estimated mean flow velocity of the ultrasonic flow meter with each chordal path of the plurality of chordal paths successively being the first chordal path; and
compute, for each chordal path of the plurality of chordal paths, a difference between the second estimated mean flow velocity and a measured mean flow velocity.

17. The system of claim 16, wherein the condition monitor is configured to generate, for each chordal path of the plurality of chordal paths, a display of the difference.

18. The system of claim 16, wherein the condition monitor is configured to determine whether the differences are indicative of a change in site conditions.

19. The system of claim 15, wherein the condition monitor is configured to:
for each chordal path of the plurality of chordal paths:
compute, for the chordal path, a predicted chordal velocity based on the reference chordal velocity ratio for the chordal path and measured flow velocities for all other chordal paths of the plurality of chordal paths;
compute a second estimated mean flow velocity for the ultrasonic meter, the second estimated mean flow velocity based on the predicted chordal velocity for the chordal path and the measured flow velocities for all other chordal paths of the plurality of chordal paths; and
compute, for each other chordal path of the plurality of chordal paths, a predicted chordal velocity ratio based on the measured flow velocity for the other chordal path and the first estimated mean flow velocity.

20. The system of claim 19, wherein the condition monitor is configured to, for each other chordal path of the plurality of chordal paths:
compute a difference between the predicted velocity ratio and the reference chordal velocity ratio for the other chordal path; and
identify a largest of the differences across the other chordal paths of the plurality of chordal paths.

21. The system of claim 20, wherein the condition monitor is configured to generate, for each chordal path, a display of the largest difference across the other chordal paths of the plurality of chordal paths.

22. The system of claim 19, wherein the condition monitor is configured to compute, for each chordal path of the plurality of chordal paths, a degree of measurement error attributable to the chordal path based on the predicted chordal velocity for the chordal path and the measured flow velocity for all other of the chordal paths.

23. A method for monitoring operation of an ultrasonic flow metering system, comprising:
in an ultrasonic flow meter comprising a spool piece defining a central passage for fluid flow; and a plurality of pairs of ultrasonic transducers disposed in the spool piece, each of the pairs of ultrasonic transducers disposed to form a chordal path across the central passage; wherein the ultrasonic flow meter comprises a plurality of chordal paths:
determining a reference chordal velocity ratio for each of a plurality of chordal paths of an ultrasonic flow meter; and
determining, for a first chordal path of the plurality of chordal paths, a first estimated mean flow velocity of the ultrasonic flow meter based on the measured velocity for the first chordal path and estimated chordal velocities for all other chordal paths of the plurality of chordal paths, the estimated chordal velocities estimated based on the measured velocity for the first chordal path and calculated velocities for all other chordal paths of the plurality of chordal paths, the calculated velocities calculated based on the measured velocity for the first chordal path and the reference chordal velocity ratios for all other chordal paths of the plurality of chordal paths.

24. The method of claim 23, further comprising:
determining the first estimated mean flow velocity of the ultrasonic flow meter with each chordal path of the plurality of chordal paths successively being the first chordal path; and
determining, for each chordal path of the plurality of chordal paths, a difference between the second estimated mean flow velocity and a measured mean flow velocity.

25. The method of claim 24, further comprising determining whether the differences are indicative of a change in site conditions based on relative trends in velocity change of the chordal paths.

26. The method of claim 23, further comprising:
for each chordal path of the plurality of chordal paths:
determining, for the chordal path, a predicted chordal velocity based on the reference chordal velocity ratio for the chordal path and measured flow velocities for all other chordal paths of the plurality of chordal paths;
determining a second estimated mean flow velocity for the ultrasonic meter, the second estimated mean flow velocity based on the predicted chordal velocity for the chordal path and the measured flow velocities for all other chordal paths of the plurality of chordal paths; and
determining, for each other chordal path of the plurality of chordal paths, a predicted chordal velocity ratio based on the measured flow velocity for the other chordal path and the first estimated mean flow velocity.

27. The method of claim 26, further comprising, for each other chordal path of the plurality of chordal paths:
determining a difference between the predicted velocity ratio and the reference chordal velocity ratio for the other chordal path; and
identifying a largest of the differences across the other chordal paths of the plurality of chordal paths.

28. The method of claim 26, further comprising determining, for each chordal path of the plurality of chordal paths, a degree of measurement error attributable to the chordal path based on the predicted chordal velocity for the chordal path and the measured flow velocity for all of the other chordal paths.

* * * * *